(12) United States Patent
Granat

(10) Patent No.: US 7,656,141 B1
(45) Date of Patent: Feb. 2, 2010

(54) SWITCHED MODE CURRENT SOURCE FOR PULSED LOADS

(75) Inventor: Stanley M. Granat, Clay, NY (US)

(73) Assignee: Lockheed Martin Corporation, Bethesda, MD (US)

(*) Notice: Subject to any disclaimer, the term of this patent is extended or adjusted under 35 U.S.C. 154(b) by 533 days.

(21) Appl. No.: 11/501,430

(22) Filed: Aug. 9, 2006

(51) Int. Cl.
*G05F 1/40* (2006.01)

(52) U.S. Cl. .................................................. 323/284

(58) Field of Classification Search ................ 323/282, 323/283, 284, 285, 351
See application file for complete search history.

(56) References Cited

U.S. PATENT DOCUMENTS

| | | | |
|---|---|---|---|
| 4,456,872 A | 6/1984 | Froeschle | |
| 5,905,370 A * | 5/1999 | Bryson | 323/283 |
| 6,178,104 B1 * | 1/2001 | Choi | 363/89 |
| 6,979,987 B2 | 12/2005 | Kernahan et al. | |
| 2006/0290388 A1 * | 12/2006 | Tolle et al. | 327/108 |

* cited by examiner

*Primary Examiner*—Adolf Berhane
(74) *Attorney, Agent, or Firm*—Howard IP Law Group, PC

(57) ABSTRACT

The present invention pertains to an arrangement wherein an inductor current is monitored and its level operates a converter switch so that the inductor current ramps up and down between two limits. The midpoint of these two limits is the average output current supplied to a pulsed load. When a pulse is first detected, the converter activates and remains in one state until the output current has ramped up to the pulsed load requirement at which time the switch changes state. The current then ramps down as the average current discharges into the load. When the output current drops to a specified minimum, the voltage supply is turned on providing for a self oscillating regulated switch. The controller responds to changes in the output current within one switching cycle so as to keep up with the transient edges of the pulsed load.

19 Claims, 8 Drawing Sheets

SWITCHED MODE CURRENT SOURCE FOR PULSED LOADS

FIELD OF THE INVENTION

This application is related to the field of switching power regulators for supplying output current to a pulsed load.

BACKGROUND

Switched mode power supplies for converting DC voltages in inductive-capacitive discharge pulsed radar applications are known in the prior art. Often they employ a buck-derived topology with feedback loops for voltage regulation and over current protection. The control loops operate with response times much slower than the transient edge level changes of the output load pulses. As a result, the power converter may lag behind the pulse edge requirement and may overshoot the requirement when the pulse terminates. Essentially, the control loops do not respond to the rapid changes in the input voltage and output voltage within a switching cycle, failing to keep up with the transient edges of a pulsed load (see e.g., Kernahan, et al U.S. Pat. No. 6,979,987). However, hysteretic current-mode control reduces the present shortcomings and additionally offers a more accurate control of inductor current, a stable output regardless of duty cycle, and excellent transient response to pulsed loads (see, Froeschle, U.S. Pat. No. 4,456,872). The advantages of hysteretic current-mode control include load-current limiting, short-circuit-proof operation, instantaneous response to load-current changes and a constant peak-to-average inductor-current ratio.

SUMMARY

The present invention pertains to a hysteretic current-mode control switching regulator having an input voltage for applying an output current to a pulsating load, wherein the regulator includes an input voltage source, inductance, storage capacitance, and a load forming a circuit having a current sensing mechanism between the inductance and the load, and a switching mechanism responsive to a maximum and a minimum current providing an average DC current to the load. When the set point of a converter in the feedback loop matches the current level of the load pulse, the charge drawn from an output capacitor is balanced by the regulator supplied current while the voltage of the pulse load remains constant and independent of the pulse width of the load.

The present invention further relates to a process wherein a pulse current is monitored between two limits. The midpoint of the limits represents a fixed output current for a pulsed load. When a current sensor detects a transmit pulse, a converter activates a switch that remains in an "on" state supplying current until the output current rises sufficiently to meet the pulsed load requirement. Once the maximum requirement has been attained, the switch is turned "off", whereby the current decreases. When the current reaches a minimum requirement, the switch is turned "on" in which case the cycle repeats itself in a self-oscillating mode to meet the regulated average power requirements of the pulse.

BRIEF DESCRIPTION OF THE DRAWINGS

The invention is best understood from the following detailed description when read in connection with the accompanying drawings. The various features of the drawings are not specified exhaustively. On the contrary, the various features may be expanded or reduced for clarity. Included in the drawing are the following figures.

DETAILED DESCRIPTION OF PREFERRED EMBODIMENTS

In the figures to be discussed, the circuits and associated blocks and arrows represent functions of the apparatus according to the present invention, which may be implemented as electrical circuits and associated wires or data busses, which transport electrical signals. Alternatively, one or more associated arrows may represent communication (e.g., data flow) between software routines, particularly when the present process or apparatus or a portion thereof is embodied in a digital process.

Figure 1A:
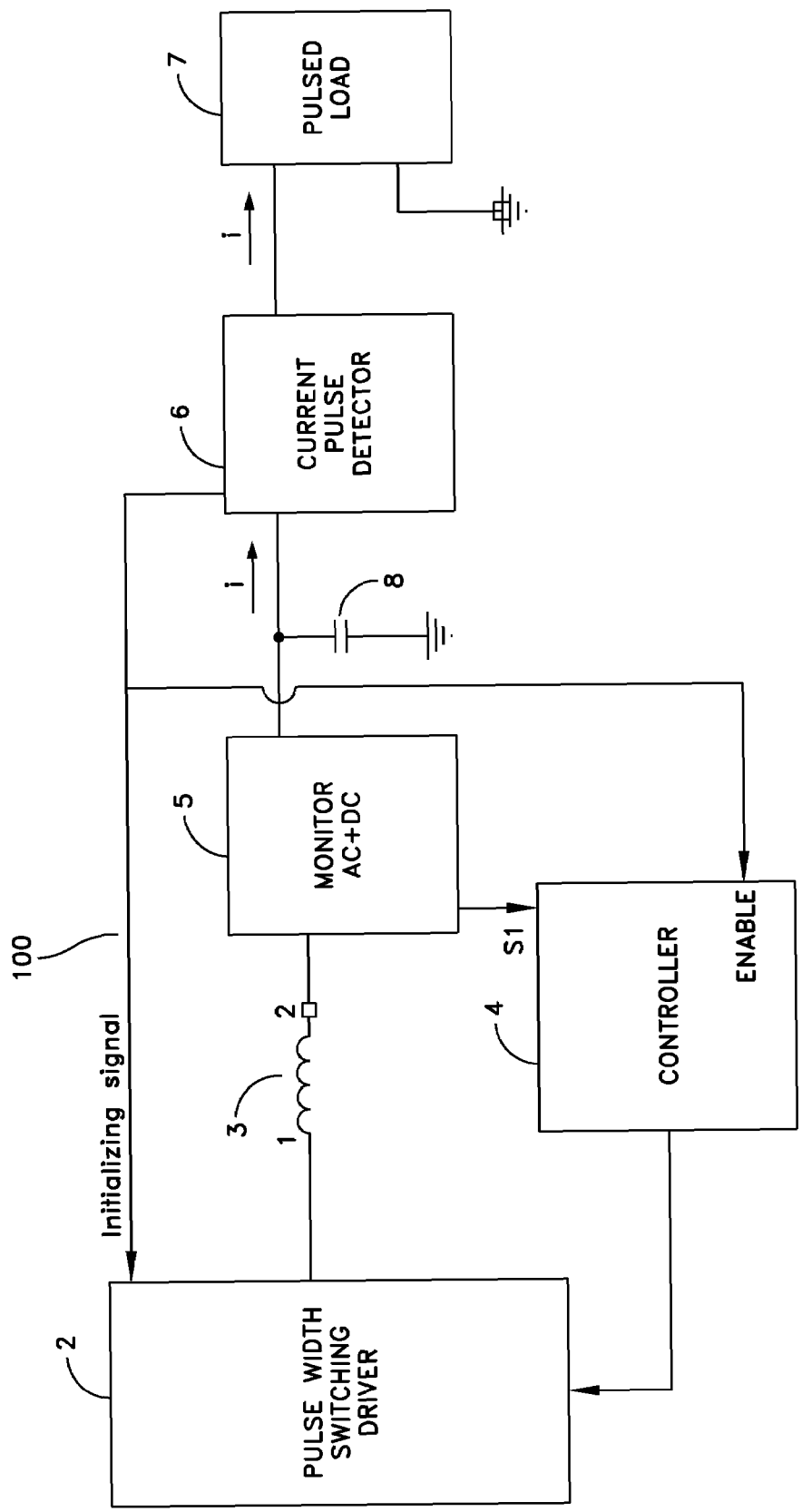
FIG. 1a is a simplified block diagram of a circuit illustrating a hysteretic current mode of control according to an embodiment of the invention.

FIG. 1a relates to a buck switching regulator 100 circuit for maintaining high efficiency regulation over a range of output current requirements. As will be described in detail below, one embodiment of the invention includes a means 5 for generating a signal corresponding to the magnitude of the output current to a load 7; a means 4 for comparing the signal to a reference to determine when the signal crosses a first and a second threshold level; a bi stable switching means 2 to provide a voltage to an inductor 3 for generating a current proportional to a midpoint current analog between the first and second threshold level provided by means 4; and whereby the first and second threshold level changes the switching means 2 state such that the midpoint between the first and second threshold level is proportional to the fixed output current i supplied to load 7 over one cycle of the bi stable switching means 2.

The switching regulator 100 employs the pulse width modulated switch driver 2 to regulate the flow of power to the pulsed output load 7. In an exemplary configuration, output load 7 may comprise an RF amplifier load. Initially the switching regulator 100 is in an "off" state. When the load 7 initially turns on (e.g. when the RF amplifiers activate), it draws current (in the form of a current pulse, for example) from a charged capacitor 8, which current is sensed by a current pulse detector 6. Upon sensing the current, detector 6 transmits an initializing signal to the bi stable pulse width switching driver 2 which enables operation of the current source circuit and initiates the switching cycle. Once the pulse switching cycle begins, current pulse detector 6 is no longer required for further operation, except to enable a current controller 4.

The output of the bi stable pulse width modulated switch 2 supplies pulsating DC square waves to energy storage elements configured as buck mode inductor 3 and capacitor 8. The AC and DC current flowing through the inductor 3 is sensed by monitor 5 which provides an input S1 to controller 4, which forms a feedback loop about the current flowing through inductor 3. The inductor 3 integrates the voltage square wave to produce a current for capacitor 8 and load 7. Current monitor 5 and controller 4 operate to generate a current feedback signal corresponding to the magnitude of the output current i in the load. The effect of the feedback is to change the duty cycle of the square wave input to inductor 3, effectively limiting the maximum or minimum current i delivered to load 7.

Figure 1B:
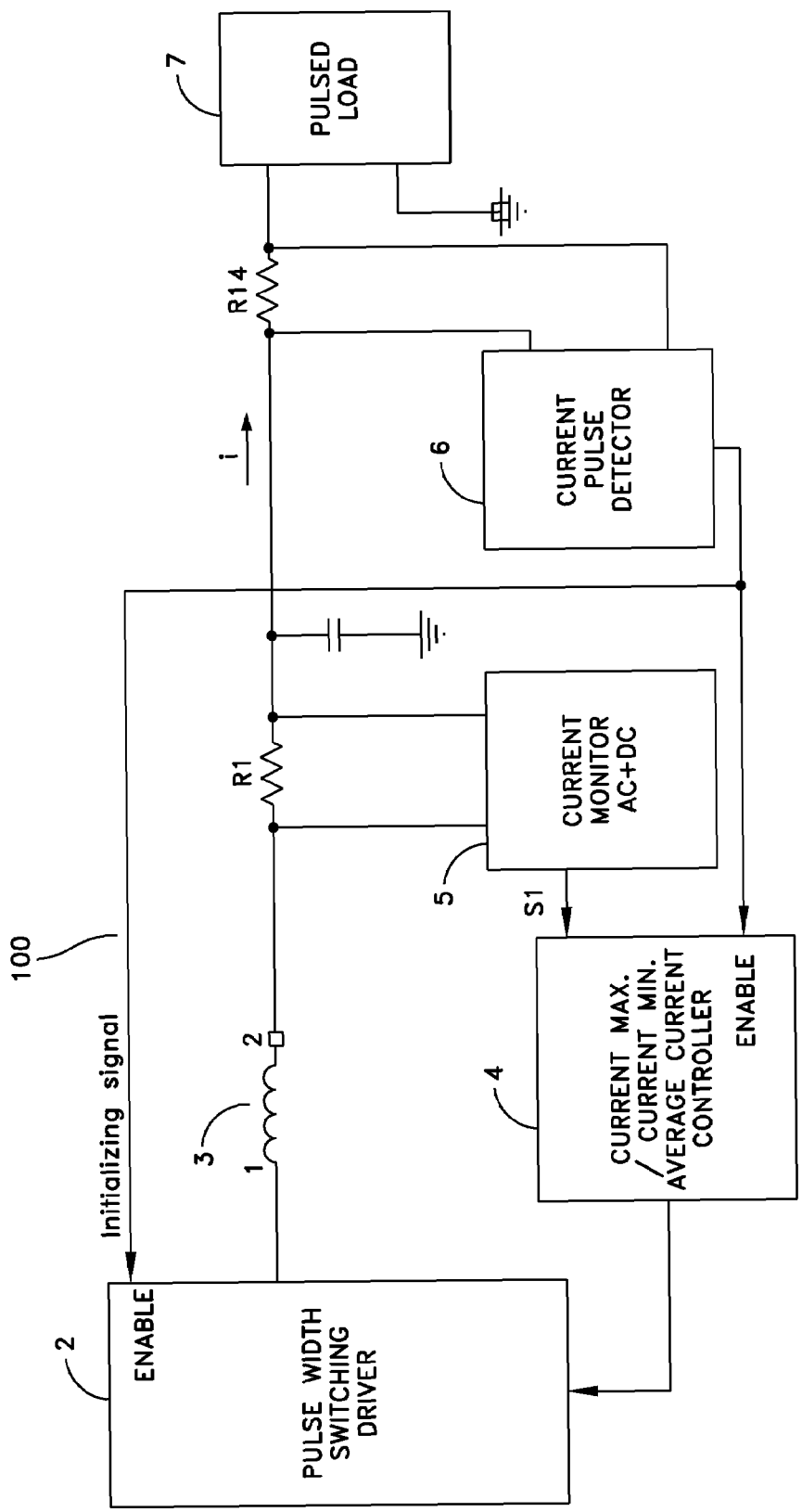
FIG. 1b is a more detailed block diagram of a circuit illustrating a hysteretic current mode of control according to an embodiment of the invention.

Embodiments of the present invention replace the conventional voltage regulator loop with its slow response and shifts the operating control to a hysteretic current mode of control. Turning to FIG. 1b, there is shown an embodiment of the present invention wherein current monitor 5 senses inductor current by monitoring the voltage across current sense resistor R1 as input to a differential current-sense amplifier (not shown) of monitor 5 as the inductor current ramps alternately between an upper limit and a lower limit current. Current monitor 5 serves as input S1 to current controller 4 to initiate start and stop signals to the pulse width modulated switch 2. Current pulse detector 6 provides an enable signal, which initiates the switching cycle and thereafter enables current monitor 5 to serve as input to current controller 4.

Those skilled in the art will appreciate that other methods of sensing the current flowing through energy storage element 3 and load 7 may be employed. As illustrated, a sense resistor R1 may be placed in series with the load 7 such that voltage drop across R1 is proportional to the current flowing into the load 7. Energy element 3 functionality may also be combined with a Hall Effect device for sensing the current whereby a magnetic field passing through a semiconductor resistor will generate a differential voltage proportional to the field.

Figure 2A:
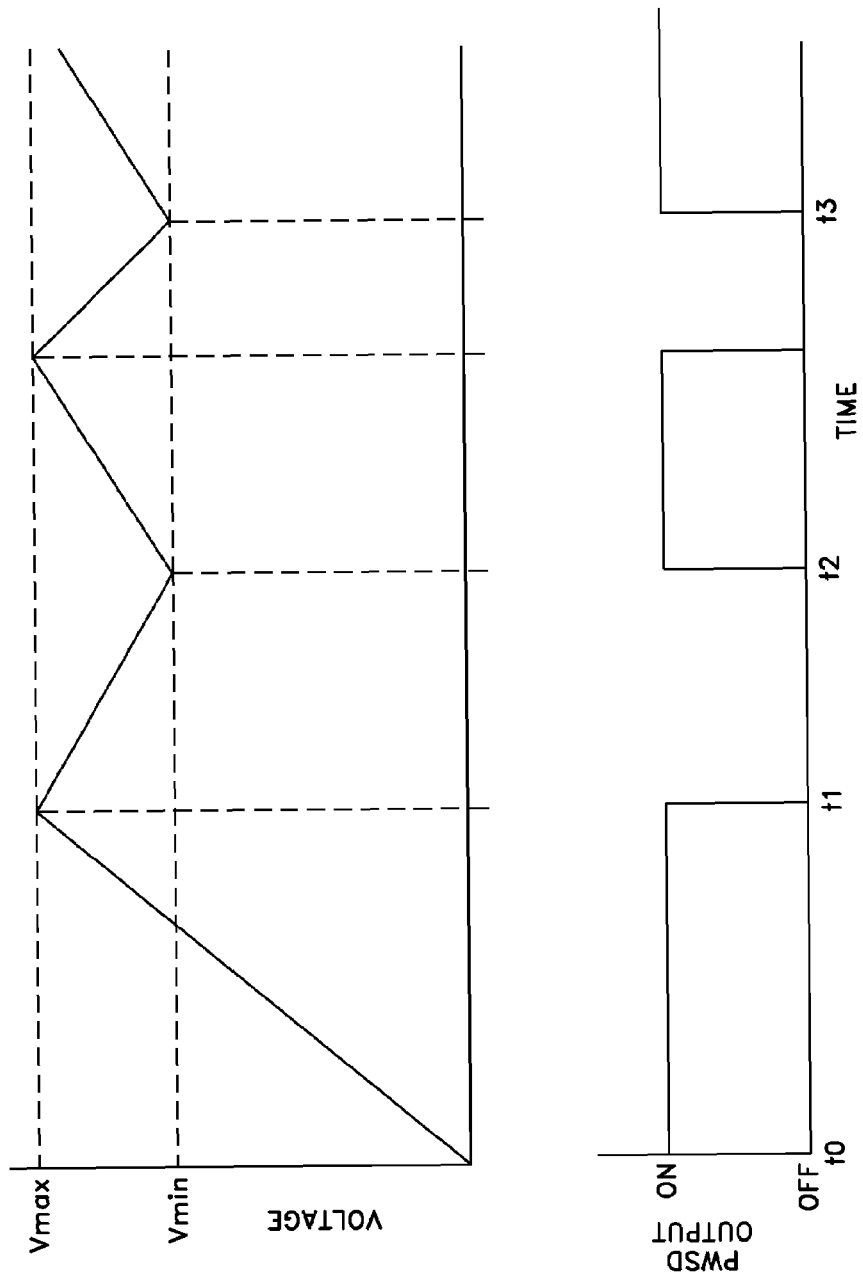
FIG. 2a is a graph showing the controller voltage as a function of the output current and further showing the states of a switching device for illustrating one embodiment of the present invention.

Referring to FIG. 1b and FIG. 2a, at time $t_0$ the current pulse detector 6 enables the switching cycle and produces an output from the pulse width modulated switch 2 in the form of a DC step voltage PWSD, at node 1 of inductor 3. The inductor 3 integrates the voltage received from the pulse width modulated switch 2 PWSD to produce a current analog signal voltage, which is proportional to the current flowing through R1 (see ordinate labeled VOLTAGE in FIG. 2a. During the period $t_0$ through $t_1$, R1 voltage begins to rise due to the pulse width switching driver 2 PWSD output. When the current through R1 as converted to voltage at the input to controller 4 reaches a preset maximum Vmax, then controller 4 forces the pulse width modulated switch 2 into an "off" state. During the period $t_1$ through $t_2$, pulse width switching driver 2 PWSD output is zero. With no voltage applied to node 1 of L1, the current through inductor 3 begins to decrease. When the current through R1 as converted to voltage at the input to controller 4 reaches a preset minimum Vmin, then current controller 4 forces the pulse width modulated switch 2 into an "on" state.

It will be recognized that the slope of the rise and fall in the saw tooth wave in FIG. 2a is proportional to the differential voltage across the inductor 3 and the magnitude of its inductance. As such, the feedback from the current sensing device generates a signal S1 corresponding to magnitude of the current flowing in inductor 3. In this manner, the current level through R1 operates the pulse width switching driver 2 so that inductor 3 current ramps up and down between two limits. The ramp up time and ramp down time is dependent upon current drawn by the load 7, the differential voltage across the inductor 3 and the magnitude of its inductance. The midpoint of the amplitude of these two limits is proportional to the fixed average output current of the pulse load 7. If the current exceeds the prescribed maximum, then pulse width switching driver 2 refrains from supplying current to inductor 3. The controller 4 responds to S1 indicative of the current flowing in inductor 3. Alternatively stated, the controller response is dependent upon the differential voltage across the inductor and the magnitude of the inductance within a switching cycle so that it essentially satisfies the current requirements during the rise time and fall time of the pulsed load 7 when the load 7 turns "on" and "off", thereby keeping up with the transient edges of the pulsed load 7.

Figure 3A:
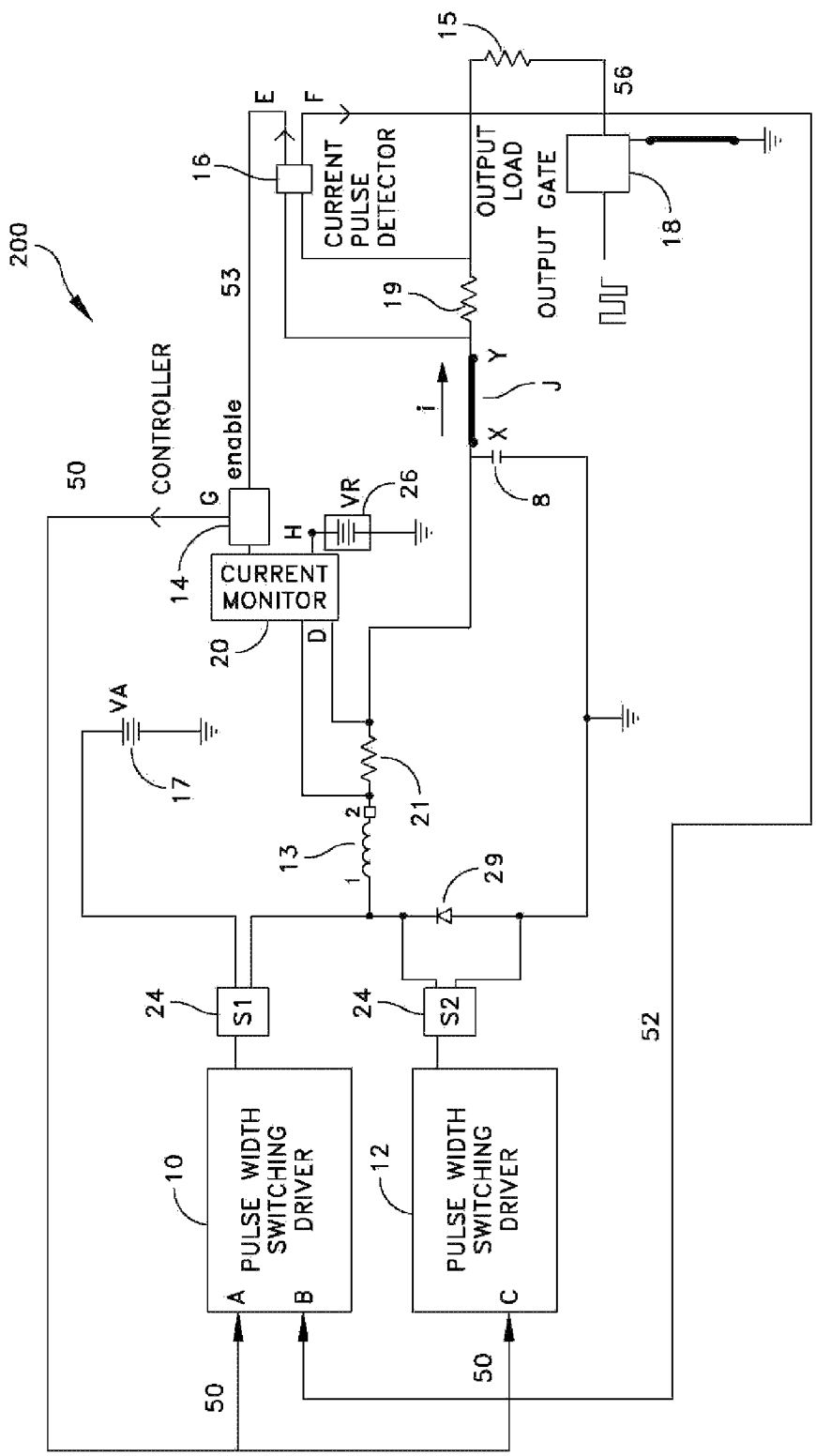
FIG. 3a illustrates a circuit for a hysteretic current mode of control according to another embodiment of the invention.

FIG. 3a illustrates a non-limiting embodiment of the invention wherein a switching regulator 200 employs a first and second modulated pulse width controlled switching driver 10, 12 to regulate power to an output load 15. In one embodiment of the invention, the switching regulator 200 converts a voltage 17 from a 270V DC voltage supply to a DC voltage of the same polarity required to satisfy the power requirements for the output of pulsed load 15. The switching regulator 200 maintains the voltage at load 15 substantially constant over the widest possible output load 15 pulse width.

Prior to the start of the operation of switching regulator 200, capacitor 8 is sufficiently charged such that when output gate 18 is turned "on" a current flows from capacitor 8 through resistor 19 through output load 15 line 56 to a reference potential such as ground. A current pulse detector 16 senses the current flow through resistor 19 resulting in an output signal F to the pulse width switching driver 10 input B that in turn switches S1, 22 "on". When switch S1 turns on it then connects a voltage source 17 to node 1 of inductor 13. The voltage applied to inductor 13 and resistor 21 and capacitor 8 form an RCL charging system that supplies power to output load 15 when output gate 18 switches "on", thereby connecting the output load 15 line 56 to ground. Output gate 18 is used for illustration, inasmuch as the particular application will determine the properties and configuration of an actual output load, such as a radar magnetron or laser pulse forming network, for example.

Figure 2B:
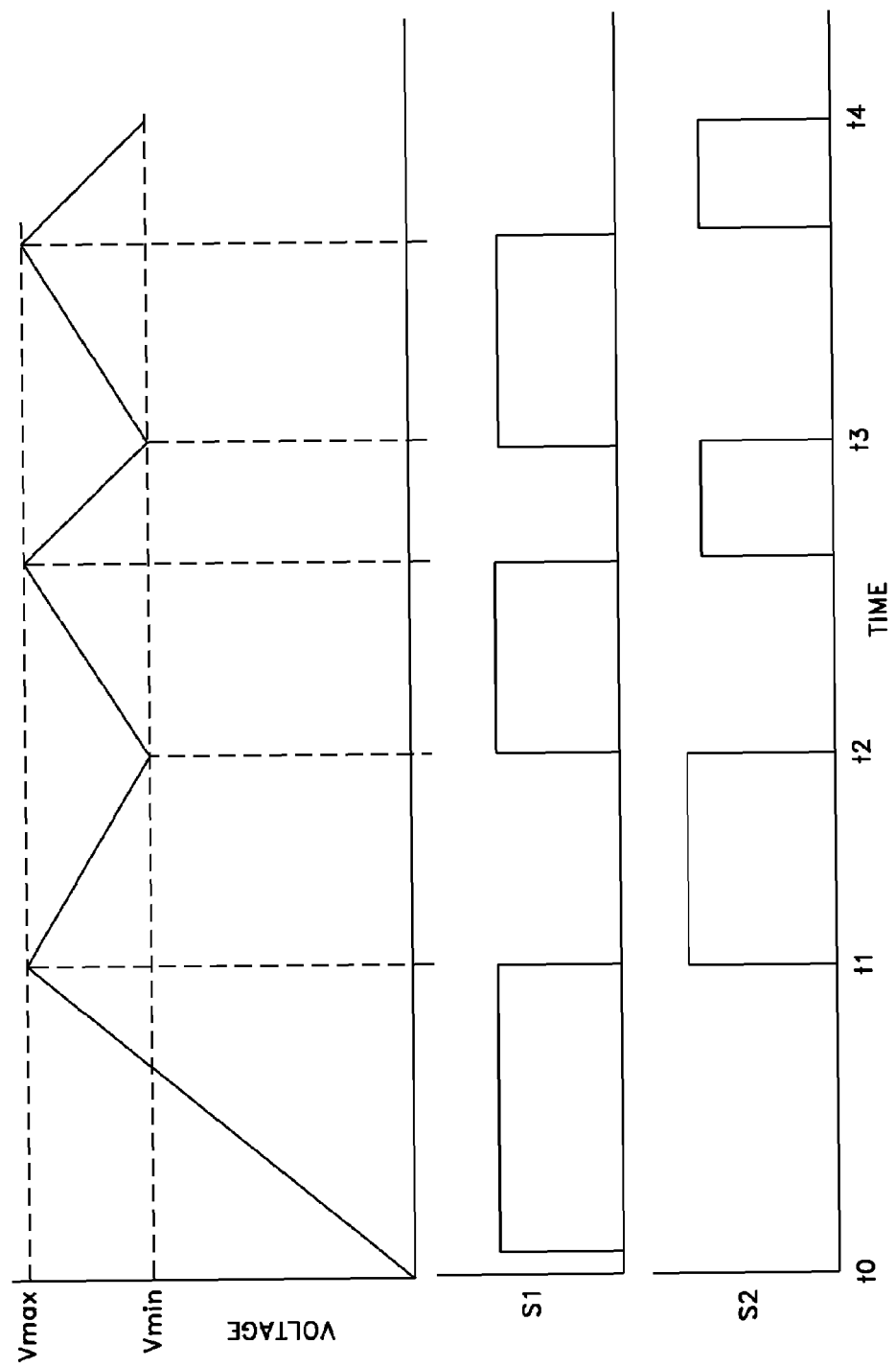
FIG. 2b is a graph showing the controller voltage as a function of the output current and further showing the states of the switching devices illustrated in FIG. 3a according to another embodiment of the present invention.

Still referring to FIG. 3a, a current monitor 20 senses current flowing through resistor 21, which is converted to a voltage input to a window detector functioning as a voltage comparator and referred to as controller 14. Current pulse detector 16 supplies an enable voltage to controller 14 allowing it to initiate a signal on line 50. FIG. 2b ordinate labeled VOLTAGE illustrates the voltage input to the window detector, which follows the current through resistor 21 and resulting switching action of switches S1, 22 and S2, 24.

As illustrated in FIG. 2b, at $t_1$ the current through resistor 21 exceeds or is equal to a specified maximum flowing through resistor 21 whereby controller 14 signals the pulse width switching driver 10 to turn switch S1, 22 "off" disconnecting voltage source 17 from the node 1 of inductor 13. Additionally, since the current through resistor 21 exceeds or is equal to a specified maximum current controller 14 signals the pulse width switching driver 12 to turn switch S2, 24 "on" short circuiting diode 29 and connecting node 1 of inductor 13 to ground potential.

As further illustrated in FIG. 2b, at $t_2$ the current analog voltage falls below a specified minimum at the input to controller 14, whereby controller 14 signals the pulse width switching driver 10 to turn switch S1, 22 "on", connecting voltage source 17 to node 1 of inductor 13. The DC voltage source 26 serves as a reference voltage to cancel the DC voltage component across R21. Additionally, when the current through resistor 21 falls below a specified minimum current and therefore the voltage falls below a specified minimum at the input to controller 14, controller 14 signals the pulse width switching driver 12 to turn switch S2, 24 "off" thereby removing a short circuit across diode 29.

As indicated by FIG. 2b, inductor 13 voltage and hence the current, ramps up and down between two limits. The midpoint of these two limits is the fixed output current of the load 15 pulse. The difference voltage across the inductor 13, i.e. between the input at node 1 and output node 2, causes current through inductor 13 to increase. The current through inductor 13 is a saw tooth wave and integrates the input voltage. The inductor current charges capacitor 8 during this time. With the switch S1, 22 switched on, the current rises in a ramped fashion through an inductor 13 causing the voltage across the sensing resistor 21 likewise to have a ramped shape. When the current through the inductor 13 reaches a maximum and the current controller is enabled, pulse width switching driver 12 input C results in actuating switch S2, 24 causing the power to the inductor 13 to be bypassed through diode 29. When switch S1, 22 is turned "off", the current in the inductor 13 cannot change instantaneously, so that the voltage across the inductor 13 will hold the current substantially constant. The input end or node 1 of inductor 13 is forced negative in voltage with respect to the output end or node 2 of the inductor 13 and the inductor 13 current then flows through the load 15 and back through S2. In the event S1 is turned "off" and S2 is "off", then the input end node 1 of the inductor 13 is forced negative in voltage by the decreasing current, eventually reaching the point where the diode 29 is turned on. The inductor 13 current then flows through the load 15 and capacitor 8 and back through diode 29.

The average output current of load 15 permits setting a threshold for the window detector or controller 14 and for current monitor 20 to sense through resistor 21 the maximum and minimum current and uses the sensed current as input to controller 14 serving as a comparator to determine when the current signal reaches a first and a second threshold level respectively by comparing the current max/min against a reference 26. The output of the comparator essentially controls the pulse width, frequency or the duty cycle of the pulse width switching driver 10, 12 that bypasses the 270 volts to inductor 13.

Figure 3B:
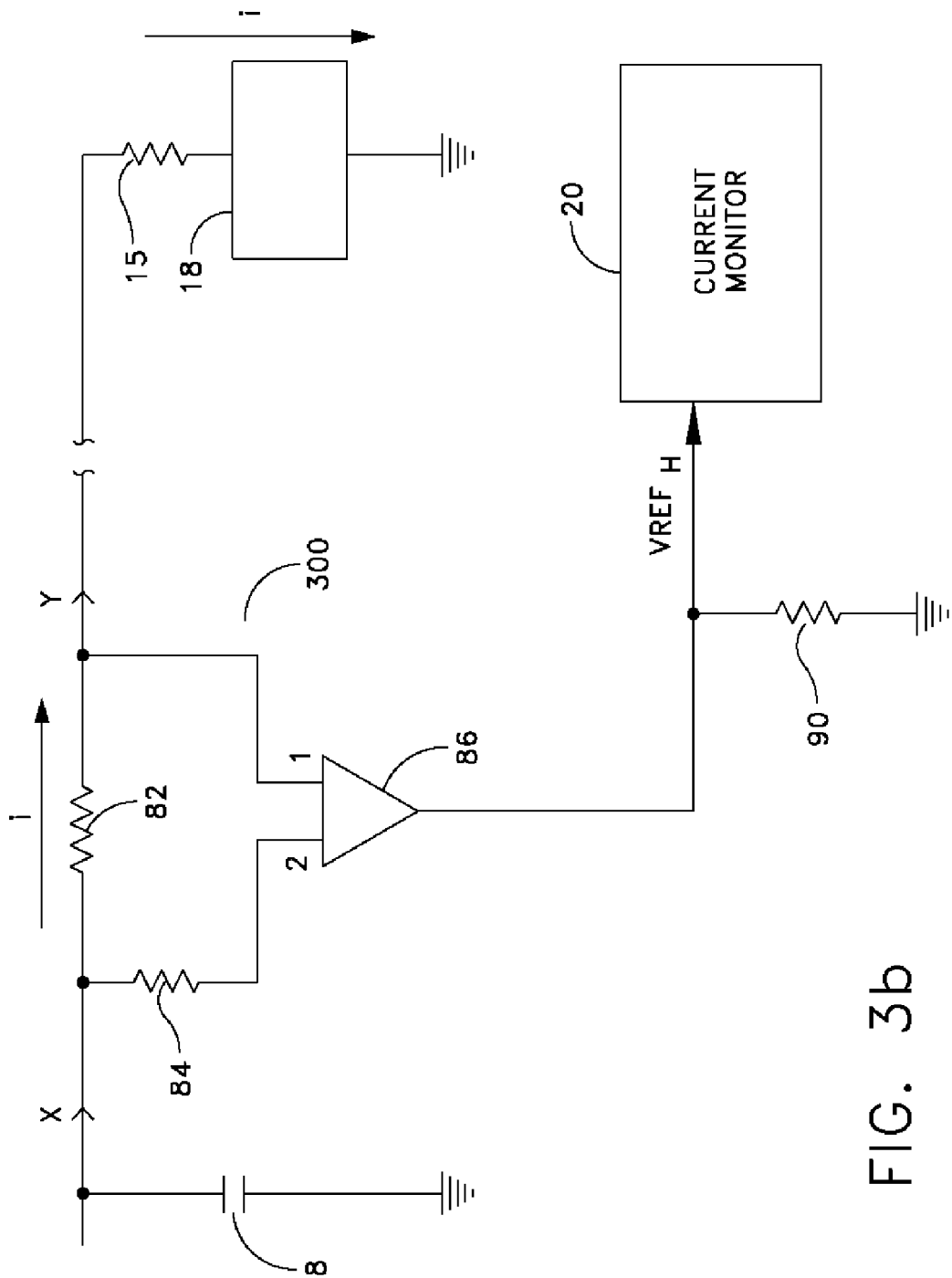
FIG. 3b illustrates a circuit for a reference current analog voltage sensor according to an embodiment of the invention.

Turning to FIG. 3b, a circuit 300 replaces the fixed DC reference 26 voltage shown in FIG. 3a as an input H for the current monitor 20. Essentially circuit 300 comprises a means for setting a DC reference potential to offset the DC component when comparing the current analog voltage reference.

The average current i flowing into the load 15 is sensed by resistor 82. The corresponding voltage drop across resistor 82 forms a differential input 1,2 through input resistor 84 to amplifier 86. The output of the differential amplifier 86 forms a reference voltage across resistor 90, which is used as a reference of the DC component. As will be appreciated by those skilled in the art the differential amplifier 86 may include response shaping elements such as capacitors and resistors in various feed back topologies to achieve a desired transient response to the change in current through resistor 82. In one embodiment of the invention the circuit 300 replaces reference 26 when installed between one of pairs X and Y in FIG. 3a circuit 200. For example, FIG. 3a line J may be replaced by circuit 300 by attaching terminal X and terminal Y to corresponding terminals X and Y in circuit 200.

In one embodiment, a process for applying an output current to pulsating load 15 includes setting the current analog voltage Vmax (see, FIG. 2b) representing the maximum current drawn by load 15 and the current analog voltage Vmin (see, FIG. 2b) representing the minimum current supplied to load 15. The average between Vmax and Vmin represents the midpoint or average fixed output current for pulsed load 15. The current flowing to the output load 15 is sensed via resistor 21 and the sensed current is compared utilizing current controller 14 to detect the maximum limit and the minimum limit as set by reference voltage 26. If the sensed current equals the maximum limit then the circuit switches the input current off by switching S1, 22 "off" and S2, 24 "on"; and, if the sensed current equals the minimum limit then switching S1, 22 "on" and S2, 24 "off" to provide an average current to the load. Essentially, if the current as set to represent an average fixed output current for the pulsed load matches the current level of the load pulse, the circuit 300 balances a charge drawn from an output capacitor 8, such that the pulse load 15 current i remains independent of pulse width.

Figure 4:
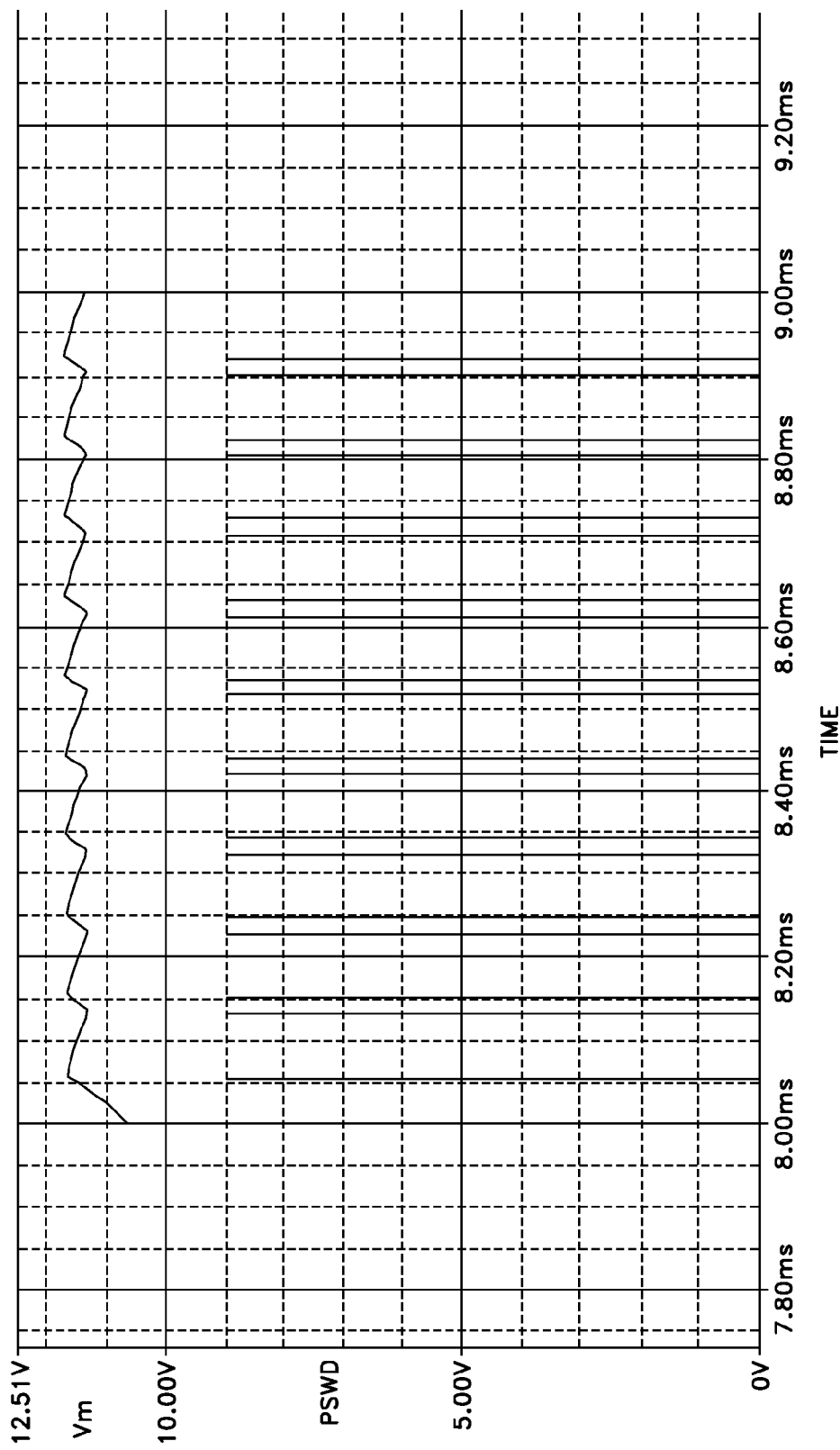
FIG. 4 is a graph showing the regulated voltage output prior to additional downstream filtering according to one embodiment of the present invention.

In FIG. 4, a saw tooth waveform represents an output voltage PSWD during an output load pulse produced by one embodiment of the present invention. Between time t equal to 8.00 ms and 8.05 ms, the output signal ramps up during the initial turn on following the current pulse detector sensing the output current draw through resistor 19. The leading edge of the output of the pulse width switching driver 10 step function causes inductor 13 to ramp up to the output voltage level $V_M$ shown initially as a 10.8 volt amplitude saw tooth wave. The component values chosen for this illustration yield a first pulse width of about 54.9 microsecond (us). The discharge interval is about 77.7 us. After the first cycle, pulse width switching driver 10 causes S1, 22 to stay "on" for 18.5 us resulting in a charge time of 18.5 us and pulse width switching driver 10 causes S1, 22 to stay "off" for about 77.7 us resulting in a discharge time of 77.7 us. In complementary fashion, pulse width switching driver 12 causes S2, 24 to stay "off" and "on" for about 18.5 us and 77.7 us, respectively. The buck mode regulator operates in continuous conduction mode with a clock cycle time of 96.2 us. This represents a clock frequency of 10.4 k Hz triggering output gate 18 and pulsing output load 15 at a 10.4 k Hz. The component values determine this clock rate and a low clock rate was chosen to simplify viewing the details of the various waveforms for this illustration. For example, changing the inductor value from 500 uH to 50 uH would raise the frequency of operation to 104 k Hz and shorten the first pulse width to 5.5 us.

Figure 5:
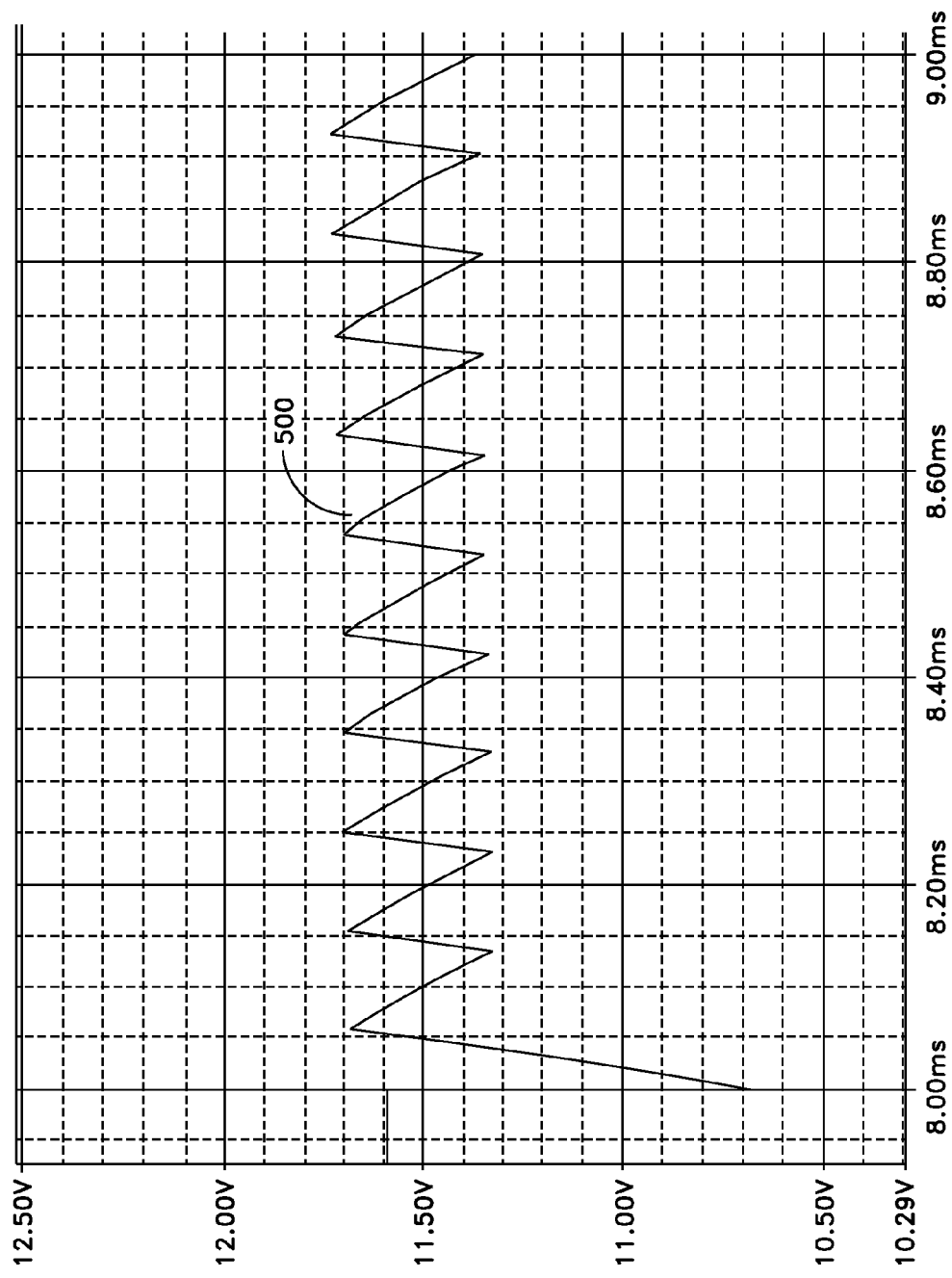
FIG. 5 is a more detailed illustration of an aspect of the regulated voltage output shown in FIG. 4.

In FIG. 5, a saw tooth waveform 500 shows a further enlargement of the output voltage produced during a typical output pulse burst. Following ramp-up, the voltage initially peaks at 11.587V, and then drops by 0.898V to 10.689V. The inductor current ramps up to the 22 A upper threshold and passes the upper threshold at 11.68V of capacitor voltage. The discharge ramp reaches the lower current threshold level of 18 A at 11.319V of capacitor voltage and then oscillates back and forth between the upper and lower thresholds for the remainder of the pulse. As the pulse turns off, some energy remains which is stored in inductor 13 (FIG. 3). The voltage surge on the right edge of the pulse peaks at 12.346V as the inductor 13 discharges this surplus energy into the output capacitor 8. The gated current source as provided by the pulse width switching drivers 10 and 12 combination reserves more current than the load 15 requires. This can be seen by the rising voltage levels on the output capacitor 8 between pulses. This amounts to a rising voltage across the pulse width instead of a voltage decay, which is the case with just an output capacitor. This indicates that this technique can raise the pulse voltage to for example, RF amplifiers during an RF burst output and supply compensation for thermal drop off of the RF envelope amplitude.

In summary, the topology embodied in the present invention utilizes a buck mode output stage wherein an output capacitor is situated between the voltage regulating supply and RF amplifier loads. The buck mode output stage is typically off and activates during an output load current pulse. A current sense threshold circuit connected between the output capacitor and the load detects the current pulse drawn from the capacitor when the load is activated and sends an initialization signal to enable operation of the circuit. The current source circuit contains a small value inductor which ramps up to the output current in a relatively short time. Its initial delay time is determined by the voltage applied across the inductor by the buck mode driver circuitry and the inductance value. During this time interval, an initial voltage drop occurs on the output capacitor. A current monitor such as a window detector monitors the current flowing in the inductor. An upper limit or threshold is set to the required average output current during a pulse, plus a differential current required to store sufficient energy to sustain the output current over a switching cycle. Once the upper threshold level is exceeded, the switches change state, the inductor discharges energy into the load and capacitor, and the current within the inductor ramps down. When the current drops below a lower threshold limit, the process repeats. This burst of activity persists as long as the output pulse exists. When it ends, the output current monitor changes state and disables the switching action.

Since the series resistance of the buck inductor(s) is kept to a minimum to limit power dissipation, the ramps, both up and down, of inductor current are practically straight line segments. The mid point of this "window" is the average of the high and low thresholds. This provides an average current demanded by the load using a controller that corrects within a single switching cycle. The timing of the switching cycle is controlled by the input voltage, the output voltage, the inductor value and the set points of the window comparator.

Since the circuit does not monitor the output voltage during operation, it can be adjusted either manually or automatically to supply slightly more current than the load requires. This integrates within the output capacitor to supply the desired rising pulse top voltage required to flatten the RF transmission envelope. The gated current booster circuit adds charge to the output capacitor almost simultaneously with the current drawn from the capacitor by the RF load. The ac ripple current within the output capacitor becomes the ripple current of the current source instead of the total pulse current.

It is understood that the circuits illustrated, capabilities displayed and functionality described herein can be implemented in hardware, software, firmware, or combinations thereof. In a preferred embodiment, the circuit threshold processing such as discussed with respect to FIG. 3, current monitor 20 and controller 14 may be implemented in software stored in the memory. It is to be appreciated that, where the functionality is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A switched mode power converter supplying an output current to a pulsating load comprising:
    a first energy storage device coupled to the load and operative to provide current to the load when the load is activated,
    a switching driver for providing a pulsating signal to a second energy storage device, said second energy storage device being coupled to said first energy storage device and operative to provide a charging current signal thereto; and
    a control arrangement operatively coupled to said second energy storage device and to said switching driver for providing a control signal to the switching driver for switching said pulsating signal on and off according to the level of the charging current signal, wherein the voltage of the second storage device ramps between first and second threshold values, thereby affecting the amount of current provided to the load by the first energy storage device.

2. A switched mode power converter supplying an output current to a pulsating load comprising:
    a first energy storage device coupled to the load and operative to provide current to the load when the load is activated;
    a switching driver for providing a pulsating signal to a second energy storage device, said second energy storage device being coupled to said first energy storage device and operative to provide a charging current signal thereto; and
    a control arrangement operatively coupled to said second energy storage device and to said switching driver for providing a control signal to the switching driver for switching said pulsating signal on and off according to the level of the charging current signal, thereby affecting the amount of current provided to the load by the first energy storage device, and wherein
    the control arrangement comprises:
        a sensor operatively coupled to said second energy storage device for providing a data signal indicative of the magnitude of said charging current signal; and
        a comparator responsive to said data signal and providing said control signal to said switching driver when said data signal reaches one of a first threshold value and a second threshold value.

3. The switched mode power converter of claim 2, wherein the first threshold value is indicative of a relatively low current value such that when said data signal reaches said low current value, said pulsating signal is switched on; and the second threshold value is indicative of a relatively high current value such that when said data signal reaches said high current value, said pulsating signal is switched off.

4. The switched mode power converter of claim 1, wherein said first energy storage device comprises a capacitor; and wherein said second energy storage device comprises an inductor.

5. The switched mode power converter of claim 1, wherein the pulsating load is an RF amplifier load.

6. A switched mode power converter supplying an output current to a pulsating load comprising:
    a first energy storage device coupled to the load and operative to provide current to the load when the load is activated;

a switching driver for providing a pulsating signal to a second energy storage device, said second energy storage device being coupled to said first energy storage device and operative to provide a charging current signal thereto;

a control arrangement operatively coupled to said second energy storage device and to said switching driver for providing a control signal to the switching driver for switching said pulsating signal on and off according to the level of the charging current signal, thereby affecting the amount of current provided to the load by the first energy storage device, and a current pulse detector coupled to said pulsating load and operative to detect when current is supplied to said load and provide an initialization signal to said switching driver for activating said driver.

7. The switched mode power converter of claim 1, wherein the switching driver provides a current sufficient to meet the pulsed load requirement within one switching cycle.

8. A switched mode power converter supplying an output current to a pulsating load comprising:

a first energy storage device coupled to the load and operative to provide an output current to the pulsating load when the load is activated;

means for generating a signal corresponding to the magnitude of output current;

means for comparing when the signal reaches a first and a second threshold level and providing an output control signal in response thereto;

means responsive to said control signal for switching on and off a pulsating signal to provide a current to the load proportional to the midpoint between the first and the second threshold level.

9. The converter of claim 8, wherein the means for switching supplies a current sufficient to meet a pulsed load requirement.

10. The converter of claim 8, wherein the switching means supplies a current sufficient to meet a pulsed load requirement within one cycle of the switching means frequency.

11. The converter of claim 10, wherein the current sufficient to meet the pulsed load requirement is the average current.

12. The converter of claim 10, wherein the means for comparing includes a current analog voltage reference.

13. The converter of claim 12, wherein the analog voltage reference is a function of the average current flowing in the output load.

14. The converter of claim 10, further including a means for setting a DC reference potential to offset a DC signal component when comparing the current analog voltage reference.

15. A method for tracking a pulse switched power supply to a pulsating load, the method comprising the steps of:

sensing a load current supplied via a first energy storage device to the pulsating load;

selectively applying a pulse width modulated signal to a second energy storage device to cause the second energy storage device upstream of the first energy storage device to produce a ramp signal having a ramp up period and ramp down period over a given switching cycle;

wherein the ramp up period and the ramp down period are dependent upon current drawn by the pulsating load and the differential voltage across the second energy storing device during the given switching cycle.

16. The method of claim 15, wherein the selectively applying a pulse width modulated signal further comprises monitoring a pulse current between two threshold values associated with the ramp signal.

17. The method of claim 16, wherein the midpoint of the two threshold values represents a fixed output current for said pulsed load.

18. The method of claim 17, wherein the selectively applying a pulse width modulated signal further comprises switching off the pulse width modulated signal when one of the two threshold values is detected.

19. The method of claim 18, wherein the selectively applying a pulse width modulated signal further comprises switching on the pulse width modulated signal when the other of the two threshold values is detected.

\* \* \* \* \*

UNITED STATES PATENT AND TRADEMARK OFFICE
CERTIFICATE OF CORRECTION

PATENT NO. : 7,656,141 B1  Page 1 of 1
APPLICATION NO. : 11/501430
DATED : February 2, 2010
INVENTOR(S) : Stanley M. Granat It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 710 days.

Signed and Sealed this

Twenty-eighth Day of December, 2010

David J. Kappos
*Director of the United States Patent and Trademark Office*